United States Patent Office 3,661,949
Patented May 9, 1972

3,661,949
HYDROCARBOXYLATION PROCESS UTILIZING AN IRON SALT COCATALYST
Donald M. Fenton, Anaheim, Calif., assignor to Union Oil Company of California, Los Angeles, Calif.
No Drawing. Filed June 11, 1969, Ser. No. 832,413
Int. Cl. C07c 51/14
U.S. Cl. 260—413         15 Claims

ABSTRACT OF THE DISCLOSURE

A process for preparation of carboxylic acids wherein the isomer distribution of the product is controlled by use of varied cocatalysts which comprises contacting an ethylenically unsaturated hydrocarbon, carbon monoxide and water under liquid phase conditions with a Group VIII noble metal catalyst in the presence of an iron cocatalyst such as an iron pentacarbonyl, di iron nonacarbonyl or iron chloride cocatalyst. The iron carbonyl cocatalysts have been found to increase the ratio of straight-chain acid to branched-chain acid and the iron chloride cocatalyst has been found to increase the ratio of branched-chain acid to straight-chain acid.

DESCRIPTION OF THE INVENTION

The invention relates to a method of producing carboxylic acids. More particularly, the invention relates to controlling the selectivity of a Group VIII noble metal catalyst in producing straight-chain acids or alternatively branched-chain acids.

It is known in the art that an ethylenically unsaturated hydrocarbon, carbon monoxide and water can be contacted with a Group VIII noble metal under liquid phase reaction conditions to produce a carboxylic acid. The products of the above hydrocarboxylation reaction are, however, a mixture of straight-chain and branched-chain products. It is generally desired to control the selectivity of the catalyst to produce either a straight-chain or a branched-chain acid. In most instances, a straight-chain acid is more desirable since these have been found to be of greater utility, particularly as detergents. It is therefore apparent that a disadvantage of the prior art is that the yield of the desired acid cannot be readily controlled.

It is an object of this invention to provide a method of controlling the isomer distribution in the products of a hydrocarboxylation reaction.

It is also an object to improve the selectivity of a hydrocarboxylation catalyst for producing a straight-chain acid.

It is an alternative object to improve the selectivity of the catalyst for producing a branched-chain acid.

Other objects of the invention will be apparent from the following description.

It is my discovery that in the above-described hydrocarboxylation reaction the incorporation of iron pentacarbonyl or di iron nonacarbonyl substantially increases the selectivity of the catalyst for the production of straight-chain acids.

In an alternate scheme, it is my discovery that incorporation in the above hydrocarboxylation reaction of iron chloride, bromide or iodide, preferably ferrous chloride, increases the selectivity of the catalyst to producing a branched-chain acid. The hydrocarboxylation proceeds as follows:

$$CR_2=CH_2 + CO + H_2O \longrightarrow \underset{\text{straight-chain}}{CR_2HCH_2COOH} + \underset{\text{branched-chain}}{CR_2CH_3COOH}$$

The ethylenically unsaturated hydrocarbon has 2 to about 25 carbons, preferably 2 to about 12 carbons and has a double bond on an alpha carbon according to the following structure:

$$R_1R_2C=CH_2$$

wherein $R_1$ and $R_2$ are hydrogen or the same or different hydrocarbon consisting of alkyl, monocyclic, cycloalkyl and/or monocyclic aryl radicals as defined in "The Handbook of Chemistry and Physics," 46th edition by Weast. Preferably the hydrocarbon consists of hydrogen and/or alkyl.

Examples of useful ethylenically unsaturated hydrocarbons are ethylene, propylene, butene-1, 2-methylbutene-1, hexene-1, 3-ethylhexene-1, 2-methylhexene-1, decene-1, 3,3 - dimethylnonene - 1, dodecene-1, 6-propyldecene-1, tetradecene1, 3-amyl-decene-1, hexadecene-1, 4-ethyltridecene-1, 5-cyclohexyldecene-1, 5,5-dipropyldodecene-1, vinylcyclohexane, allylcyclohexane, styrene, 6-phenylhexene-1, 1,3-diphenylbutene-1, 3-benzylheptene-1, etc.

The terms "straight-chain" and "branched-chain" used herein refer to acids wherein the alpha or the beta carbon respectively of the ethylenically unsaturated hydrocarbon becomes covalently bonded to the carbon of the carbonyl group, i.e., $CR_2HCH_2COOH$ is "straight-chain" and $CR_2CH_3COOH$ is "branched-chain."

The catalyst of the invention comprises a Group VIII noble metal in complex with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines, and bismuthines can also be employed. In general these biphyllic ligands have the following structure:

$$E(R)_3$$

wherein E is trivalent phosphorus, arsenic, antimony or bismuth; and
wherein R is the same or different alkyl having 1 to about 10 carbons, cycloalkyl having 4 to about 10 carbons or aryl having 6 to about 10 carbons; examples of which are methyl, butyl, nonyl, cyclohexyl, cyclodecyl, phenyl, tolyl, xylyl, tetramethylphenyl, etc. Preferably at least one R is aryl, e.g., phenyl, tolyl, xylyl, etc. and, most preferably, the ligand is triaryl.

Examples of suitable biphyllic ligands having the aforementioned structure and useful in my invention to stabilize the catalyst composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)phosphine,
phenyldiisopropylphosphine,
phenyldiamylphosphine,
ethyldiphenylphosphine,
phenylditolylphosphine,
xylyldiphenylarsine,
tolyldi(m-xylyl)stibine,
trixylylphosphine, trixylylarsine,
trixylylstibine,
cyclopentyldixylylstibine,
dioctylphenylphosphine,
tridurylphosphine,
triethylphenylphosphine,
trixylylbismuthine, etc.

Of the aforementioned, the aryl phosphines and particularly the triarylphosphines (e.g., triphenylphosphine) are preferred because of their greater activity.

The Group VIII noble metal may be ruthenium, rhodium, palladium, osmium, iridium or platinum. Preferably the Group VIII noble metal is palladium due to its demonstrated greater activity. A catalytic quantity of the metal is added (e.g., 0.002–2% of the reaction medium) and the metal may be added as a soluble salt, a carbonyl, a hydride or as a chelate.

The Group VIII metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantty of biphyllic ligand be in excess (e.g., 10–300%) of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates, e.g., acetate, propionate, isobutyrate, valerate, halide, etc. may be but need not be included in the complex catalyst of this invention. These components may be incorporated in the catalyst by the formation of the catalyst complex from a Group VIII metal salt of the indicated anions.

Examples of suitable sources of the noble metal are as follows: iridium carbonyl chloride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate (II), chloropentaamminorhodium(III)chloride, rhodium dicarbonyl chloride dimer, rhodium nitrate, rhodium trichloride, rhodium carbonyl hydride, rhodium(1)chloride, ruthenium trichloride, tetraamminorutheniumhydroxychloro chloride; etc.

The reaction is performed under liquid phase conditions and generally but not necessarily in the presence of an organic liquid having a solvency for the reactants and the catalyst and being inert to the reactants or to the reaction conditions. Suitable solvents include, for example, hydrocarbons, ketones, ethers, esters and acids. Examples of the foregoing are hexane, heptane, benzene, toluene, acetone, diethyl ketone, diisopropyl ketone, di-iso-propyl ether, di-n-butyl ether, ethylene glycol di-isobutyl ether, methyl o-tolyl ether, triethylene glycol diethyl ether, methyl acetate, n-dibutyl phthalate, acetic acid, propionic acid, butyric acid and toluic acid.

The preferred solvent is a fatty acid having at most about 25 carbons, preferably, at most about 12 carbons. Examples of such are acetic acid, propionic acid, butyric acid, pivalic acid, pentanoic, decanoic acid and pentadecanoic acid, etc.

The reaction can also be performed in the absence of the above liquids by performing the reaction in an excess, 2–100 times that stoichiometrically required, of the reactant unsaturated hydrocarbon when it is a liquid at the reaction conditions. This can be accomplished for example in the batch process by terminating the reaction prior to most of the reactant hydrocarbon being consumed or for example in a continuous process by adding sufficient hydrocarbon to maintain the desired level.

As stated earlier herein, the invention comprises performing the above hydrocarboxylation reaction in the presence of an iron carbonyl or halide cocatalyst. The selection of the particular iron cocatalyst depends on whether it is desired to increase the relative yield of the straight-chain or the branched-chain acid. When it is desirable to increase the yield of the straight-chain acid, the iron is added to the reaction medium as an iron pentacarbonyl $Fe(CO)_5$, or as di iron nonacarbonyl $Fe_2(CO)_9$. When it is desired to increase the yield of the branched-chain acid, an iron chloride, iodide or bromide is added to the reaction medium. Preferably iron chloride is used as the cocatalyst. The iron chloride, bromide or iodide may be added as a ferrous or ferric salt, however, it is preferably added as a ferrous salt.

The iron cocatalyst may be added to the reaction medium as a complex with the above-mentioned biphyllic ligand, preferably with an aryl phosphine or may be added separately to the reaction medium. The biphyllic ligand is generally added to the reaction medium in excess of that required to form a complex with the Group VIII noble metals and thus the biphyllic ligand may form a complex with the iron carbonyl or halide after its addition to the reaction zone. It is preferable in most instances to separately add the Group VIII noble metal, the iron cocatalyst and the biphyllic ligand to the reaction medium. The iron cocatalyst can be incorporated in the reaction medium in catalytic quantities, e.g., 0.002–5% of the reaction medium, and generally it is preferable to incorporate the iron cocatalyst in the reaction medium in a quantity from 1.5 to 3 times the molar amount of the Group VIII noble metal.

In one embodiment when a straight-chain acid is desired, the reaction can be conducted in the presence of hydrogen. This can be achieved by supplying hydrogen, as a gas or in the form of hydrogen-forming agents, such as sodium boro hydride, lithium aluminum hydride, lithium hydride, hydrazine, etc., to the reaction zone to provide a pressure of hydrogen therein from about 60 atmospheres, preferably 1 to 30 atmospheres. In some applications wherein high conversion is desired lower hydrogen pressures are preferred and hence hydrogen pressures from 1 to about 13 atmospheres, preferably 1 to about 8 atmospheres, are also contemplated.

In another embodiment for production of straight-chain acids, the reaction may be performed in the presence of limited amounts, and preferably in the complete absence, of a strong mineral acid. The molar amount of such acid in the reaction medium should be maintained at less than 0.5 and preferably less than 0.05 times the molar amount of the Group VIII noble metal. The acid concentration can be controlled below the aforementioned limits by judicious selection of the catalyst components added to the reaction zone or by the addition or an acid acceptor, to be described hereinafter. In a preferred embodiment, the reaction is performed in the presence of hydrogen and in a limited amount of mineral acid.

To aid in controlling the acid concentration, I prefer to perform the reaction in the presence of an acid acceptor which reduces the concentration of reactive acid in the reaction medium. An acid acceptor is defined herein as a substance which will decrease the content of, or inhibit the formation of, hydrogen ion in the reaction medium (i.e., a compound in a solution to which strong acids may be added without substantially lowering the pH of the solution). Suitable acid acceptors or buffers include the alkali metal carboxylates, e.g., lithium acetate, sodium propionate, cesium butyrate, potassium acetate, cesium 2-ethylhexanoate, etc. and in general any carboxylate of a fatty acid having 1 to 20 carbons, preferably 2 to 15 carbons, e.g., acetate, propionate, isobutyrate, n-butyrate and valerate. Also an alkali or alkaline earth metal salt of an inorganic oxo, polyfunctional acid such as carbonic, arsenous, arsenic, boric acid is a suitable acid acceptor. Specific examples of these are cesium carbonate, potassium bicarbonate, barium carbonate, calcium carbonate, calcium arsenate, sodium arsenate, potassium borate, lithium arsenate.

The aforementioned acid acceptors, when employed, can be used in concentrations from about 0.01 to 5 weight percent, preferably 0.5 to 2 percent of the reaction medium, in amounts sufficient to lower the acid concentration to below the aforementioned maximum levels. Preferably, the amount of acid acceptor is insufficient to replace all of the preferred halide ligand since in such a case the activity of the catalyst decreases, which results in poor conversion of the reactants. Preferably, therefore, enough acid acceptor, preferably a $C_1$-$C_5$ carboxylate, is added to replace all but one halide but insufficient to replace all the halide ligand. The acid acceptors may be incorporated in the reaction medium as solutions or as slurries or may be added as finely divided solids with a particle size from about 0.001 to about 0.5 inch average particle diameter to insure a sufficient surface area for adequate contacting with the reaction medium and complete adsorption of the acid during the reaction. The acid acceptors are particularly advantageous when carboxylic acids are the solvent and/or the product of the reaction.

In still another embodiment for straight-chain acid production, the reaction is performed in a limited amount of anion equivalent. Preferably, the reaction is conducted in the presence of hydrogen. The molar amount of anion equivalent (including that in complex with the Group VIII noble metal) should be maintained from 0.1 to 2.0, preferably from 0.5 to 1.5 times the molar amount of Group VIII noble metal. Generally the anion equivalent, e.g., chloride, is supplied with the source of Group VIII noble metal, e.g., palladium chloride. In such as case the ratio of anion equivalent to palladium may be 2.0, however, the ratio may be decreased if desired by addition of hydrogen which reacts with chloride to form hydrogen chloride which may then be removed from the reaction medium in conventional manner, e.g., ion exchange and/or precipitation means. In general, the amount of anion equivalent may be increased by adding an appropriate salt, e.g., lithium chloride or decreased by known ion exchange and/or precipitation methods, e.g., ion exchanging hydroxyl for chloride, and/or adding silver nitrate to precipitate chloride.

The most preferred mode of practice comprises conducting the carbonylation in the presence of hydrogen and in the presence of an acid acceptor since, as previously mentioned, each encourage the formation of the straight-chain acid. Hence, a preferred carbonylation comprises contacting an unsaturated hydrocarbon, carbon monoxide and water, with a complex catalyst comprising a Group VIII noble metal and a biphyllic ligand in a hydrogen atmosphere, e.g., 1 to 30 atmospheres, in the presence of an acid acceptor such as an alkali salt of a fatty acid. In another preferred embodiment, the reaction is conducted in a hydrogen atmosphere and in the presence of a limited concentration of mineral acid and anion equivalent, accomplished, for example, by the additio of hydrogen gas, an acid acceptor and limitation of the anion equivalent.

The above hydrocarboxylation process may be conducted at mild temperatures, e.g., 70°–300° C., preferably 175–250° C. and most preferably 190–235° C. and at pressures of 1 to 60, preferably 10 to 30 atmospheres absolute sufficient to maintain liquid phase reaction conditions. The carbon monoxide pressure is generally sufficient to maintain the requisite pressure, however, if necessary, an inert gas, e.g., nitrogen, may be added to increase the pressure.

The reaction can be performed batchwise or in a continuous fashion. When operating batchwise, the liquid reactants, catalyst, cocatalyst and reaction medium can be introduced into the reaction zone to form a liquid phase therein. The reaction zone can be pressured with carbon monoxide and with an inert gas and/or hydrogen if desired. The reaction medium can then be heated to the desired temperature. When the unsaturated hydrocarbon is a gas at ambient temperatures it can of course be separately added or added with carbon monoxide. When performing the reaction in a continuous fashion the reaction medium including the reactants and the catalyst can be charged to the reaction zone to form a liquid phase therein and the ethylenically unsaturated hydrocarbon, carbon monoxide and water continuously introduced into the reaction zone to contact the reaction medium containing the catalyst and cocatalyst.

The gaseous reactants can be withdrawn as a separate effluent, cooled, depressured and the non-condensibles, chiefly carbon monoxide, recycled for further contacting. The liquid product can be withdrawn separately from the reaction zone by with-drawing the reaction stream of the liquid reaction medium containing the products and recovering the desired straight-chain or branched-chain carboxylic acid therefrom by conventional processing such as distillation. The by-product straight-chain or branched-chain acid may be recycled to the hydrocarboxylation reaction zone if desired in order to further increase the yield of the branched-chain or straight-chain acid, respectively.

Having described my invention, the following Examples 1–3 demonstrate the results actually obtained using the discovery of the invention. Example 4 demonstrates the results obtained in the absence of the invention.

Example 1

To a ½-gallon autoclave were added ½ gram palladium chloride, 3 grams triphenylphosphine, 2 grams di iron nonacarbonyl, 400 milliliters acetic acid, 15 grams of water and 80 grams of 1-octene. The autoclave was purged with nitrogen and pressured with carbon monoxide to about 55 atmospheres. The reaction mixture was heated to and maintained at 125° C. for about 2 hours while being continuously stirred. The heating was then discontinued, the autoclave was cooled and depressured, and the liquid contents were removed and analyzed. It was found that 41 grams of nonanoic acid and 14 grams of alpha-methyloctanoic acid were formed. The ratio of straight-chain to branched-chain acid was 2.9.

Example 2

To a ½-gallon autoclave were added ½ gram palladium chloride, 3 grams triphenylphosphine, 2 grams iron pentacarbonyl, 400 milliliters acetic acid, 15 grams water and 80 grams of 1-octene. The autoclave was purged with nitrogen and pressured with carbon monoxide to about 55 atmospheres. The mixture was heated to and maintained at 125° C. for 2 hours while being continuously stirred. The heating was then discontinued, the autoclave was cooled and depressured, and the liquid contents were removed and analyzed. It was found that 46 grams of nonanoic acid and 18 grams of alpha-methyloctanoic acid were formed. The ratio of straight-chain to branched-chain acid was thus 2.56.

Example 3

To a ½-gallon autoclave were added ½ gram palladium chloride, 3 grams triphenylphosphine, 5 grams ferrous chloride hydrate, 400 milliliters acetic acid, 15 milliliters water and 80 grams 1-octene. The autoclave was purged with nitrogen and pressured with carbon monoxide to about 55 atmospheres. The mixture was heated to 125° C. for about 2 hours while being continuously stirred. The heating was then discontinued, the autoclave was cooled and depressured, and the liquid contents were removed and analyzed. It was found that 31.8 grams of nonanoic acid and 37.1 grams of alpha-methyloctanoic acid were formed. The ratio of straight-chain to branched-chain acid was thus 0.78. Similar results can be obtained with an equivalent amount of iron bromide or iodide as the cocatalyst.

Example 4

This example demonstrates the result actually obtained in a comparable hydrocarboxylation reaction without the addition of an iron carbonyl or halide.

To a ½-gallon autoclave were added ½ gram palladium chloride, 3 grams triphenylphosphine, 400 milliliters acetic acid, 15 milliliters of water and 80 grams of 1-octene. The autoclave was purged with nitrogen and pressured with carbon monoxide to about 55 atmospheres. The mixture was heated to and maintained at 125° C. for about 2 hours while being continuously stirred. The heating was then discontinued, the autoclave was cooled and depressured, and the liquid contents were removed and analyzed. It was found that 53 grams of nonanoic acid and 27 grams of alpha-methyloctanoic acid were formed. The ratio of straight-chain to branched-chain acid was 2.0. This ratio represents a substantially lower ratio than that obtained in Examples 1 and 2 wherein an iron carbonyl was added to the reaction medium and represents a substantially higher ratio than that obtained in Example 3 wherein ferrous chloride was added to the reaction medium.

The following Examples 5–6 illustrate other modes of practice presently contemplated:

Example 5

To a ½-gallon autoclave may be added 1½ grams of platinum chloride, 5 grams tritolylstibine, 2 grams iron pentacarbonyl, 400 milliliters heptane, 30 milliliters water and 80 grams of heptadecene-1. The autoclave is purged with nitrogen and pressured with carbon monoxide to about 50 atmospheres. The mixture is heated to and maintained at 150° C. for about 10 hours while being continuously stirred. The heating is then discontinued, the autoclave is cooled and depressured and the liquid contents are removed. It may be observed that eicosanoic acid can be recovered in an enhanced yield from that obtained when the reaction is performed in the absence of an iron carbonyl.

It is also contemplaced that 150 parts of tetracosene-1, 4-phenylnonene-1, or 2-methyl-4-cycloheyloctadecene-1 may be substituted for the 80 parts of heptadecene-1 in the above examples without substantially departing from the illustrated mode of practice.

Example 6

To a ½-gallon stirred autoclave may be added ½ gram palladium bromide, 5 grams triphenylphosphine, 5 grams iron pentacarbonyl, 500 milliliters propionic acid, 200 milliliters water and 100 milliliters of nonene-1. The autoclave is purged with nitrogen and pressured with carbon monoxide to 20 atmospheres. The autoclave is then pressured with hydrogen to about 60 atmospheres. The mixture is then heated to and maintained at 190° C. for 5 hours while being continuously stirred. The autoclave is then cooled and depressured and the contents are removed and the straight-chain product is separated from the branched-chain product. The branched-chain product is then recycled to the autoclave and the process repeated in the presence of the added amount of the branched-chain acid. The steps described above are repeated and the final product analyzed to reveal the formation of decanoic acid. Any of the previously mentioned olefins can similarly be used in the process, e.g., 5-cyclohexyltridecene-1 may be substituted for nonene-1 in the above process without substantially departing from the illustrated mode of practice.

I claim.

1. In a hydrocarboxylation reaction for production of a carboxylic acid wherein an alpha ethylenically unsaturated hydrocarbon having from 2 to 25 carbons, carbon monoxide and water are contacted in a liquid reaction medium containing from 0.002 to 2 weight percent of a soluble salt, carbonyl, hydride or chelate of a Group VIII noble metal in complex association with a biphyllic ligand having the structure:

$$ER_3$$

wherein E is trivalent phosphorus, arsenic, antimony or bismuth; and wherein R is the same or different alkyl having 1 to about 10 carbons, cycloalkyl having 4 to about 10 carbons or aryl having 6 to about 10 carbons;

the improvement of conducting the hydrocarboxylation reaction under liquid phase reaction conditions at a temperature between 70° and 300° C. and in the presence of from 0.002 to 3 weight percent of an iron cocatalyst selected from the class of iron pentacarbonyl, di iron nonacarbonyl and iron chloride, bromide and iodide.

2. The process of claim 1 wherein the iron cocatalyst is di iron nonacarbonyl or iron pentacarbonyl.

3. The process of claim 1 wherein the ethylenically unsaturated hydrocarbon has the formula $$R_1R_2C{=\!\!=}CH_2$$

wherein $R_1$ and $R_2$ are hydrogen or the same or different alkyl.

4. The method of claim 3 wherein the hydrocarbon has 2 to about 12 carbons.

5. The process of claim 1 wherein the Group VIII noble metal is palladium and the biphyllic ligand is a triarylphosphine whose aryl groups have 6 to 9 carbons.

6. The process of claim 1 wherein the hydrocarboxylation is conducted in a hydrogen pressure of 1–60 atmospheres.

7. The process of claim 1 wherein the reaction medium is a fatty acid having 1 to 25 carbons.

8. The method of claim 4 wherein the Group VIII noble metal is palladium and the biphyllic ligand is triphenylphosphine.

9. The method of claim 8 wherein branched-chain and straight-chain acids are formed in the process and wherein at least a portion of said branched-chain acids is recycled to the reaction medium, and said temperature is from 175° to 250° C.

10. The process of claim 1 wherein said iron cocatalyst is an iron bromide, chloride or iodide.

11. The process of claim 10 wherein the iron halide is ferrous chloride.

12. The method of claim 11 wherein the Group VIII noble metal is palladium and the biphyllic ligand is triphenylphosphine.

13. The hydrocarboxylation of an alpha ethylenically unsaturated hydrocarbon having from 2 to 25 carbon atoms which comprises contacting said hydrocarbon with carbon monoxide and water in the presence of a liquid reaction medium of a fatty acid having at most 12 carbons and containing (1) from 0.002 to 2 weight percent of a soluble palladium salt, carbonyl, hydride or chelate in complex association with a biphyllic ligand having the structure:

$$PR_3$$

wherein R is the same or different alkyl having from 1 to about 10 carbons, cycloalkyl having from 4 to 10 carbons or aryl having from 6 to about 10 carbons; and (2) from 0.002 to 3 weight percent of an iron cocatalyst selected from the class of iron pentacarbonyl, di iron nonacarbonyl and iron chloride, bromide and iodide; said contacting being conducted at a temperature of from 70° to 300° C. and a pressure of from 1 to 60 atmospheres sufficient to maintain liquid phase reaction conditions.

14. The hydrocarboxylation defined in claim 13 wherein said cocatalyst is iron pentacarbonyl or di iron nonacarbonyl and wherein from 0.01 to 5 weight percent of an acid acceptor selected from the class consisting of fatty acid and alkali metal carboxylates having from 2 to 15 carbons is also present in said reaction medium.

15. The hydrocarboxylation defined in claim 14 wherein hydrogen is also present during said contacting in an amount between about 1 and 30 atmospheres.

References Cited

UNITED STATES PATENTS

| | | | |
|---|---|---|---|
| 2,739,169 | 3/1956 | Hagemeyer | 260—533 A |
| 3,059,031 | 10/1962 | Alderson | 260—533 A |
| 3,415,871 | 12/1968 | Oliver | 260—533 A |
| 3,437,676 | 4/1969 | Kutepow et al. | 260—533 A |

OTHER REFERENCES

Gould, Mec & Structure in Org. Chem., pp. 171–172 (1959).

Tsuji et al., JACS /90:1/, Jan. 3, 1968, pp. 94–107.

LORRAINE A. WEINBERGER, Primary Examiner

R. D. KELLY, Assistant Examiner

U.S. Cl. X.R.

252—428, 429 R; 260—514 C, 515 C, 533 A